US007861973B1

(12) United States Patent
Olson

(10) Patent No.: US 7,861,973 B1
(45) Date of Patent: Jan. 4, 2011

(54) WIND RESPONSIVE POWER GENERATION SYSTEM

(76) Inventor: Gaylord Olson, 273 Jefferson Rd., Princeton, NJ (US) 08540

( * ) Notice: Subject to any disclaimer, the term of this patent is extended or adjusted under 35 U.S.C. 154(b) by 157 days.

(21) Appl. No.: 12/410,506

(22) Filed: Mar. 25, 2009

Related U.S. Application Data

(60) Provisional application No. 61/072,570, filed on Apr. 1, 2008.

(51) Int. Cl.
*B64D 17/30* (2006.01)
(52) U.S. Cl. .............................. 244/155 A; 244/155 R; 290/44
(58) Field of Classification Search ............. 244/155 A, 244/155 R, 153 R; 290/44, 55; 320/101
See application file for complete search history.

(56) References Cited

U.S. PATENT DOCUMENTS

| 3,338,536 | A | | 8/1967 | Hull et al. | |
|---|---|---|---|---|---|
| 4,129,272 | A | | 12/1978 | Jones et al. | |
| 5,213,289 | A | | 5/1993 | Barresi | |
| 5,417,390 | A | * | 5/1995 | Southwick | 244/155 A |
| 7,188,808 | B1 | | 3/2007 | Olson | |
| 7,275,719 | B2 | | 10/2007 | Olson | |
| 2006/0226294 | A1 | * | 10/2006 | Logosz et al. | 244/152 |
| 2008/0210826 | A1 | * | 9/2008 | Ockels et al. | 244/155 A |
| 2009/0072092 | A1 | * | 3/2009 | Griffith et al. | 244/155 A |
| 2010/0026007 | A1 | * | 2/2010 | Bevirt | 290/55 |
| 2010/0133385 | A1 | * | 6/2010 | Olson | 244/155 A |

* cited by examiner

*Primary Examiner*—Christopher P Ellis
(74) *Attorney, Agent, or Firm*—LaMorte & Associates

(57) ABSTRACT

A system and method for generating electricity using kites and controlling the kites in flight. A plurality of kites is provided that include a first kite and at least one subsequent kite. The kites form a string of kites that are connected by at least one tether to a reel or similar structure. Each tether has a first end that is coupled to the first kite and a second end that is coupled to the reel. Each tether passes through openings in each subsequent kite. An actuator is carried by the subsequent kite proximate each tether opening. The actuator operates between an engaged condition and a disengaged condition. Each actuator engages a tether when in its engaged condition, therein selectively holding the subsequent kite at a fixed point along each tether. The movability of the subsequent kite enables the string of kites to be deployed and retrieved in a simplified manner.

12 Claims, 8 Drawing Sheets

WIND RESPONSIVE POWER GENERATION SYSTEM

RELATED APPLICATIONS

The application is a continuation-in-part of provisional patent application No. 61/072,570, filed Apr. 1, 2008, entitled Wind Responsive Power Generation System

BACKGROUND OF THE INVENTION

The present invention relates to power generation and more particularly to systems and methods for converting wind energy acting on aerial wind driven elements to mechanical or electrical power.

As fossil fuels become depleted and more expensive, the need for cost competitive methods and apparatus for harnessing renewable energy sources increases. The wind was long used for powering sailing ships and windmills, but the advent of steam engines or turbines, internal combustion engines, and gas turbines provided cheaper, more convenient energy sources. Less expensive and more efficient apparatus and methods for utilizing wind power would now be beneficial.

Ground based windmills (or wind turbines) are currently being used to generate electricity and to drive pumps. However, the cost to generate electricity with a wind turbine is still more expensive than the cost of electricity generated from some fossil fuels. Wind turbines have a high capital cost relative to power generated. Wind speed, in general, is higher and more consistent with increasing altitude.

Therefore, to take advantage of the greater force of winds available at higher altitudes it is desirable to make use of airborne or aerial apparatus at altitudes above the heights reasonably reachable by ground-based wind turbines.

Various systems for generating electric or rotary power using wind present at higher altitudes are disclosed in U.S. Pat. No. 7,188,808 titled Aerial Wind Power Generation System and Method which issued March 2007 and U.S. Pat. No. 7,275,719 titled Wind Drive Apparatus For An Aerial Wind Power Generation System which issued to me, Gaylord Olson, Oct. 2, 2007, and whose teachings are incorporated herein by reference, as if fully repeated herein.

By way of example, there is disclosed in U.S. Pat. No. 7,275,719 an aerial power generation system which includes a guide line that extends skywards at a selected angle. The guide line is connected at the upper end to a support body. A wind driven apparatus with a driven element is slidably mounted on the guide line. The driven element uses a sail-like design with curvature about a horizontal axis so as to maximize the lift and drag wind forces, or the driven element includes a rotatable hub with a plurality of airfoil blades. The driven element is connected by a tow line to a reel on a shaft of a power generating means. Means are provided for changing the driven element from high force configurations to low force configurations. The camber of the airfoil driven element is controlled to maximize the force when the driven element is in a high force configuration and to minimize the force when the driven element is in a low force configuration.

Referring to prior art FIGS. 10, 11, and 12 (which correspond to FIGS. 40, 41 and 42 of U.S. Pat. No. 7,275,719) there is shown a flat platform 341 which can rotate about a vertical axis 345 to maintain orientation with respect to the wind direction. Located above the platform is a series of triangular kites 343. These are similar to delta kites, except that instead of a single tether line there is a tether line attached to each one of the three corners of each kite. Triangular kites are used by way of example and the kites could be of any other shape (e.g., rectangular, trapezoidal) with a tether line connected to each corner.

FIGS. 10, 11 and 12 show three small kites 365, which may be radio controlled, to improve the stability of the system and to keep tension in the tether lines regardless of the angle of attack of the triangular kites. These small kites 365 may not be essential to the operation and may be a negative factor in some situations.

FIGS. 10, 11 and 12 show rectangular boxes 342 on top of each corner of the platform 341. At a minimum, there is included in each box a reel for the tether line, a gearbox and a computer controlled motor/generator. This enables power generation.

Still another aspect of the invention is the recognition of the desirability to simplify the system by sharing certain components. For example, in the prior art system there is a motor/generator per tether line. A simpler approach includes having several tether lines transfer power to a single motor/generator.

These aspects of the invention are addressed in systems embodying the invention.

SUMMARY OF THE INVENTION

The present invention is a system and method for generating electricity using kites and controlling the kites in flight for that purpose. A plurality of kites is provided that include a first kite and at least one subsequent kite. The kites form a string of kites that are connected by at least one tether to a reel. Each tether has a first end that is coupled to the first kite and a second end that is coupled to the reel. Each tether passes through openings in each subsequent kite. An actuator is carried by the subsequent kite proximate each tether opening. The actuator operates between an engaged condition and a disengaged condition. Each actuator engages a tether when in its engaged condition, therein holding each subsequent kite at a fixed point along each tether. Conversely, each activator releases a tether when in its unengaged condition, therein enabling each subsequent kite to freely move along each tether under the first kite.

By selectively disconnecting the subsequent kites from the tethers, the entire string of kites can be better retrieved and stored.

The string of kites is part of an aerial wind responsive power generation system. Power generation is achieved by controlling the angle of attack (pitch angle) and flight path of a kite or a train of kites, operated in synchronism, through computer control of the tether lines. This may also be achieved by remote operation of control surfaces on the kites.

In accordance with the invention, the launching and retrieval of a train of kites can be done either fully automatically or quasi-automatically via remote control.

Also, there may be a single motor/generator combination or at least one motor and at least one generator for power generation and for controlling the reeling out and reeling in of all of the tether lines.

Also, in systems embodying the invention, the train of kites, when not in use for power generation, is preferably positioned in a sandwich like pattern on top of the platform. To best accomplish this layout, the tether control and power generation hardware may be located below the platform.

Still further, a specific form of dual-capstan winch is used which allows for much higher line tension than is possible with a multi-layer line reel.

Still further is the use of three way gearboxes which have three shafts. If any one of the shafts is held fixed, there will be a transfer of rotation (with some fixed ratio) using the other two shafts.

BRIEF DESCRIPTION OF THE DRAWINGS

In the accompanying drawings, which are not drawn to scale, like reference characters denote like components.

DETAILED DESCRIPTION OF THE INVENTION

Figure 1:
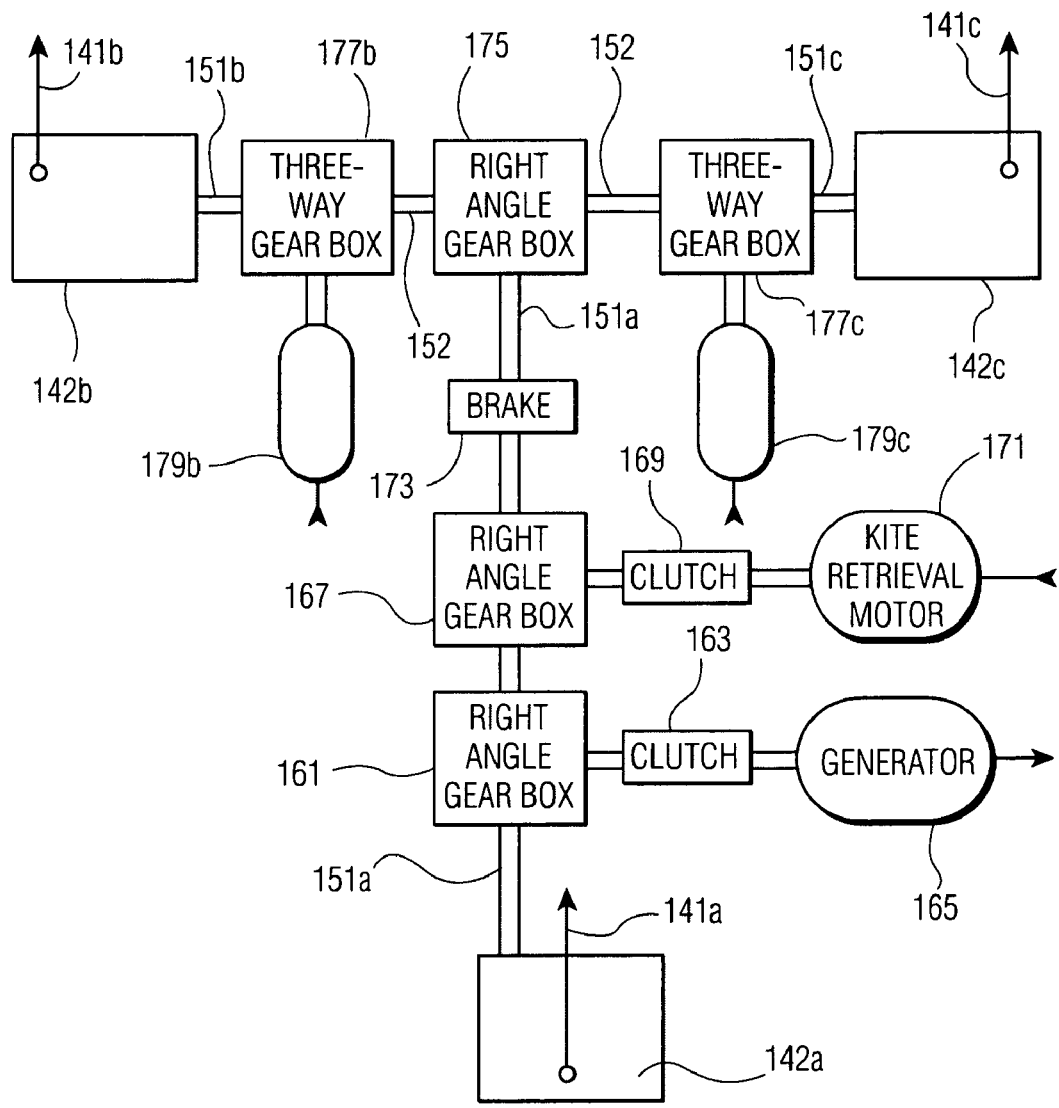
FIG. 1 is a diagram of a system for controlling three tether lines of a kite (or a train of kites) and for power transfer in accordance with the invention.

FIG. 1 is a layout diagram of a system embodying the invention for controlling three tether lines. FIG. 1 illustrates an embodiment for controlling the tether lines of one or more triangular kites and for power transfer. The system of FIG. 1 includes:

1—3 corner sections 142a, 142b, 142c which function as dual capstan and take-up reels for controlling the reeling out and reeling in of tether lines 141a, 141b, 141c (the corner sections and their functions may be similar, for example, to those shown in FIGS. 1 and 2 of U.S. Pat. No. 4,234,167);

2—There are 4 shafts, 151a, 151b151c and 152;

3—Shafts 151a, 151b, 151c are coupled to their respective tether lines 141a, 141b, 141c;

4—Shaft 151a is coupled via a right-angle gearbox 161 and clutch 163 to generator 165;

5—Shaft 151a is also coupled via a right-angle gearbox 167 and clutch 169 to kite retrieval motor 171;

6—Shaft 151a may be controlled (slowed) via brake 173;

7—Shaft 151b extends from a 3 way gearbox 177b to tether line control section 142b and shaft 151c extends from a 3 way gearbox 177c to tether line control section 142c, and shaft 151a extends to control section 142a;

8—A tether line adjustment motor 179b is coupled via gearbox 177b to shaft 151b and section 142b to selectively adjust tether line 141b and a tether line adjustment motor 179c is coupled via gearbox 177c to shaft 151c and section 142c to selectively adjust tether line 141c.

The pitch angle and orientation of the kites can thus be controlled by using one or more of the following methods:

a—The tether line control units (i.e. dual capstan and take-up reel systems) 142a, b, and c can be used in parallel with the two three-way gearboxes 177b, c to change the length of the two downwind tether lines (141b, 141c) relative to the third tether line, and thereby change the pitch angle of the kites. The two three-way gearboxes 177b, 177c can also be operated in a differential mode to control the orientation of the kite with respect to the tether line axis;

b—Rotating the platform (via electromechanical or other means) away from the wind vector direction (clockwise or counterclockwise); and/or c—Using a rudder and/or elevons (elevators and ailerons) or any other suitable control surfaces generally located at the downwind edge of the top kite (or any other suitable points).

Figure 10:
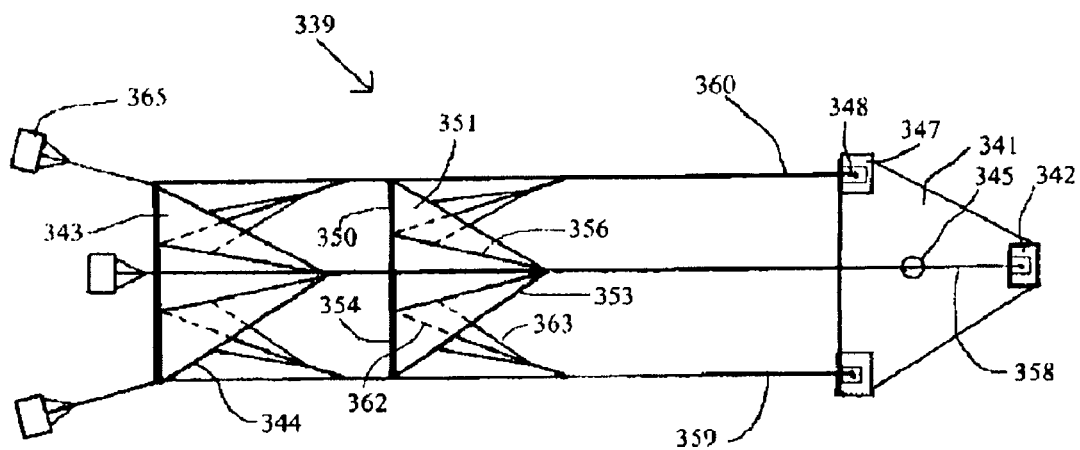
FIGS. 10, 11 and 12, identified as prior art, are perspective views of an aerial wind power generation system shown in FIGS. 40, 41 and 42 of U.S. Pat. No. 7,275,719.

Elevons (or a flap) at the top kite can be used to give an upward force and thereby counteract the force of gravity when the kites are moving upwind. This will better assure good control over pitch angle of the kites and may be used to eliminate the need for the 3 small kites shown in FIG. 40 of U.S. Pat. No. 7,275,719 and in FIG. 10 herein.

In the system shown in FIG. 1 it may be desirable to use a large speed reduction ratio gear at the output of the tether line adjustment motors (179b, 179c). This may be achieved by using a worm gear inside each of the three-way gearboxes. This arrangement ensures that when the tether line adjustment motors are not energized their drive shafts will not rotate. It may be assumed that the drive shafts (151a, 151b, 151c) connecting the three dual-capstan reels (in control units 142a, b, and c) are interconnected with a 1:1 ratio. This means that the three tether lines will be shortened or lengthened in synchronism when the tether line adjustment motors are not energized. Thus it may be assumed that the top most right angle gearbox (175) in FIG. 1 is a 1:1 miter gear set. On the other hand, it is preferable to have a large step-up speed ratio for the other two right-angle gearboxes, so a bevel gear and pinion gear may be used for these.

In accordance with the invention, the orientation and altitude of the kites as well as the speed and direction of the wind may be monitored and the corresponding signals (and others) are fed to a computer (not shown) programmed to control (and optimize) the various motors, clutches and brake shown in FIG. 1.

Also, it should be understood that FIG. 1 is a simplified example which would be most appropriate for a constant wind condition. To allow for a full range of wind speeds and variability, a system which includes a continuously variable transmission and controls, similar to what is found with hybrid automobiles, could be used.

Figure 1A:
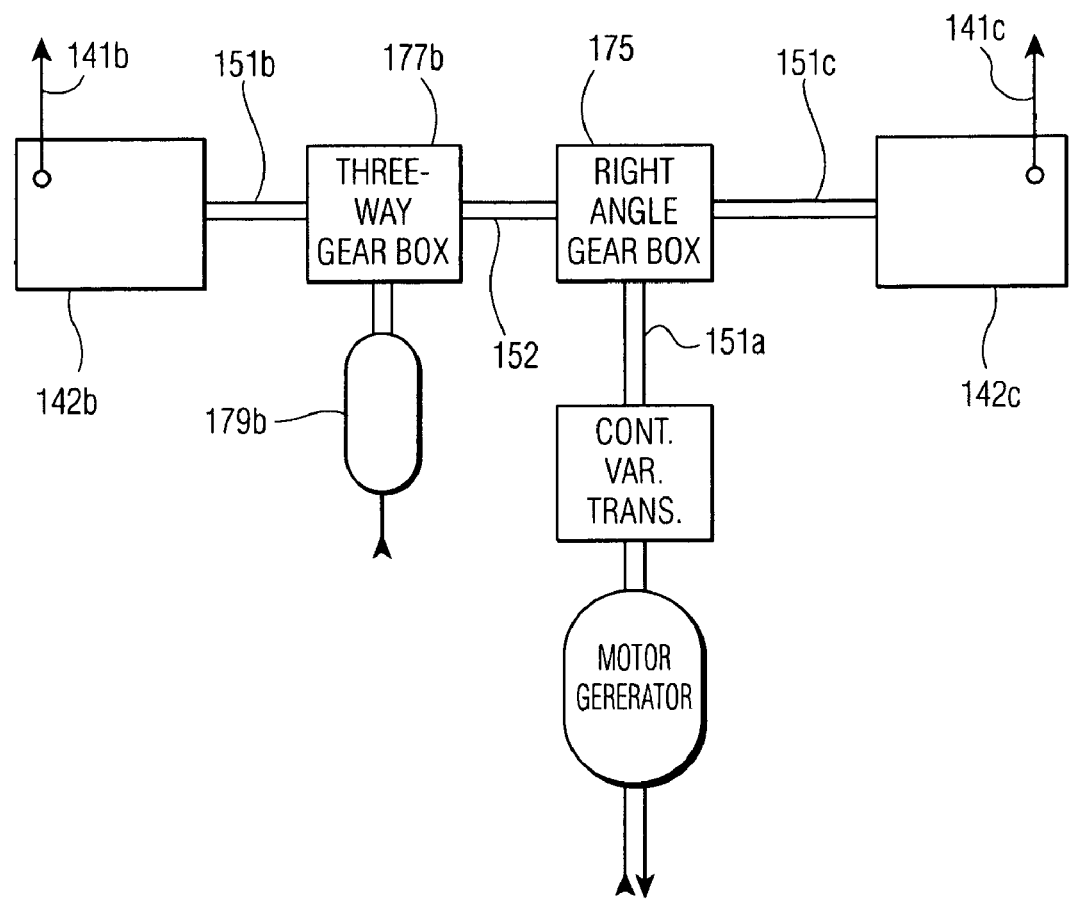
FIG. 1A is a simplification of FIG. 1 for the case of two rather than three tether lines.

FIG. 1A shows a simplification for the case of kites that need only two tether lines (as will be described below) and also shows the use of a continuously variable transmission and a motor/generator unit (instead of a separate motor and generator). It should be noted that the three-way gearboxes in FIGS. 1 and 1A may be essentially the same as conventional automobile differentials.

Optimizing the operation to get maximum power includes determining the best range of travel for the kites during their power generation cycle. It should be noted that if the range of travel of the kites is too great, the kites will spend too much time near the earth, where the wind speed is relatively low. If the range of travel is too low, the kites will have too much time spent changing their pitch angle relative to the steady speed downwind travel time.

The pattern of travel of the kites may be controlled, and we consider, for example, the following two possibilities:
1. The kites travel in a generally straight line, both going out (downwind) and coming back (upwind), with the tether lines staying in a vertical plane which is generally parallel to the wind vector direction. This pattern is simple and relatively easy to control.
2. The kite(s) may be controlled to travel in a crosswind direction (e.g., a figure-8 configuration or pattern) during the downwind portion of the power cycle, and then controlled to convert to straight line travel during the upwind travel time. The crosswind pattern generates higher power than the straight line pattern, however it requires stronger kite construction and more sophisticated control systems. For the crosswind pattern, a higher lift to drag (L/D) ratio and lower camber (curvature of airfoil) is preferred.

Attachment of the Kites:

To more securely attach the kites to the tether lines, knots may be tied (formed) in the tether lines at the points where the kites are attached. If two knots are formed close to each other (e.g., 1 to 3 inches), a spring loaded clip may be used at each kite corner to allow very fast attachment and detachment. A properly sized clip located between two knots would not be able to slip up or down beyond the knots. These knots would be small enough to pass around any capstan, pulley and reel in the system. However, spring loaded clips generally require either human involvement or a sophisticated robotic mechanism.

Figure 2A:
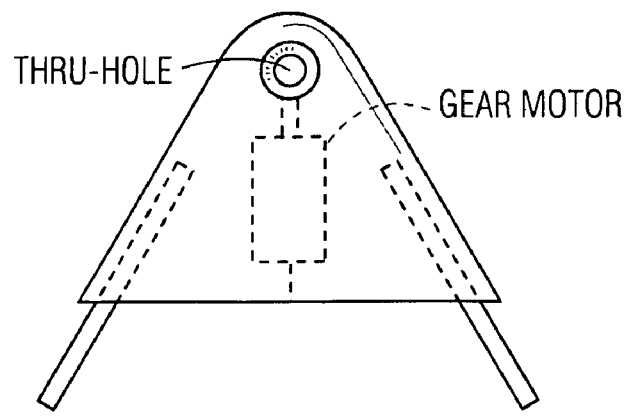
FIGS. 2A and 2B include, respectively, a top view and a side view of a remote control tether line attachment assembly.
Figure 2B:
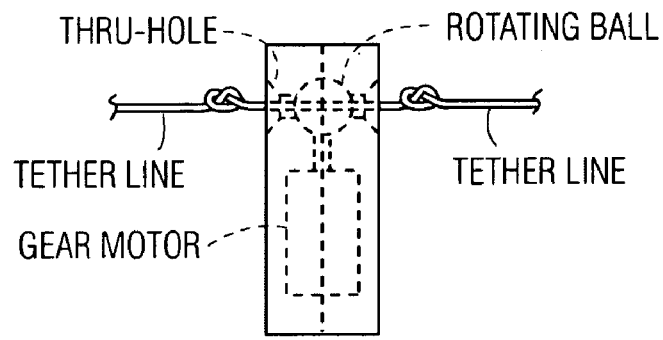

Another kite attachment approach is shown in FIGS. 2A and 2B (top view and side view). In accordance with this approach, remote controlled actuators which include ball valves (or similar devices) are built into each corner of the kites. The opening of the ball valves is controllable. When the valve is fully open the hole diameter is large enough to allow the knots in the tether line to pass through. When the valve is partially closed the knot (or knots) will not pass through the valve. A gear motor may be used to control the ball in the valve for attachment and detachment of the kite(s). The design and operation of the valve must be such that the tether line is not overly pinched, which could cause damage to the line. Also, the valve may be selected to be a cylindrical type (rather than a ball type) design which could be simpler and less expensive to manufacture. A linear slide arrangement would also perform this function. In all cases, any sharp edges which could scrape the tether lines should be avoided, and precise control of the motion is needed for best results. If the rotatable element is a strong-walled tube, it will be possible to use a single knot rather than two at each kite corner.

Power and Control for Actuators:

The remote controlled actuators (or gear motors) in each of the corners of the kites may be powered by batteries and/or solar power. Since power to operate the gear motor would only be needed sporadically and with very short bursts, the average power drain from the battery is very small. A radio control receiver similar to those used for model airplanes can serve to link the gear motors on the kites to the ground-based control system.

Figure 11:
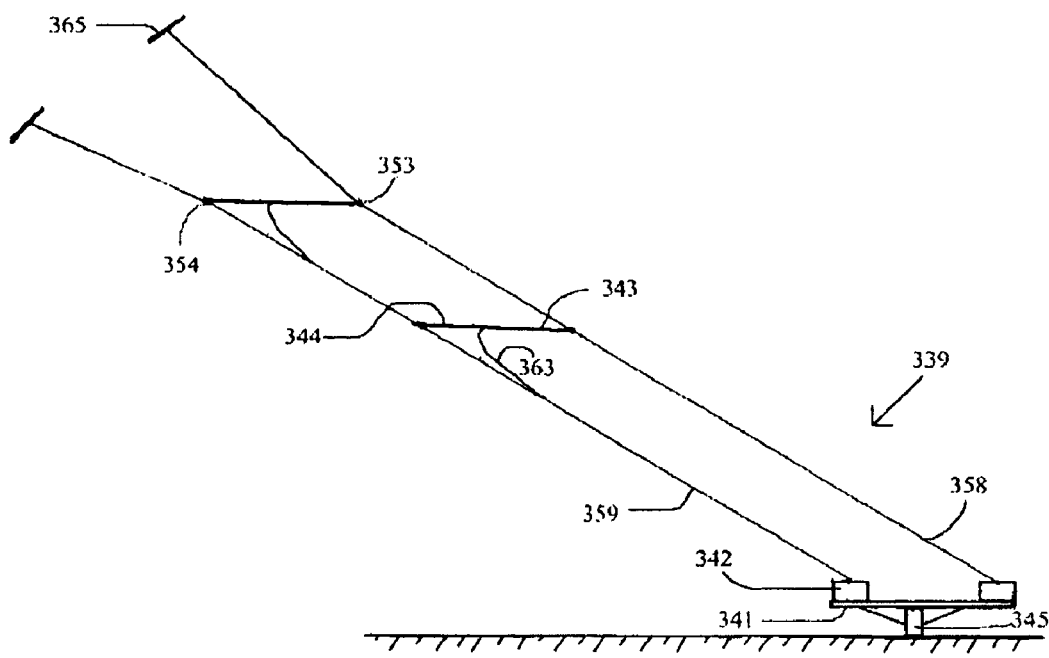
Figure 12:
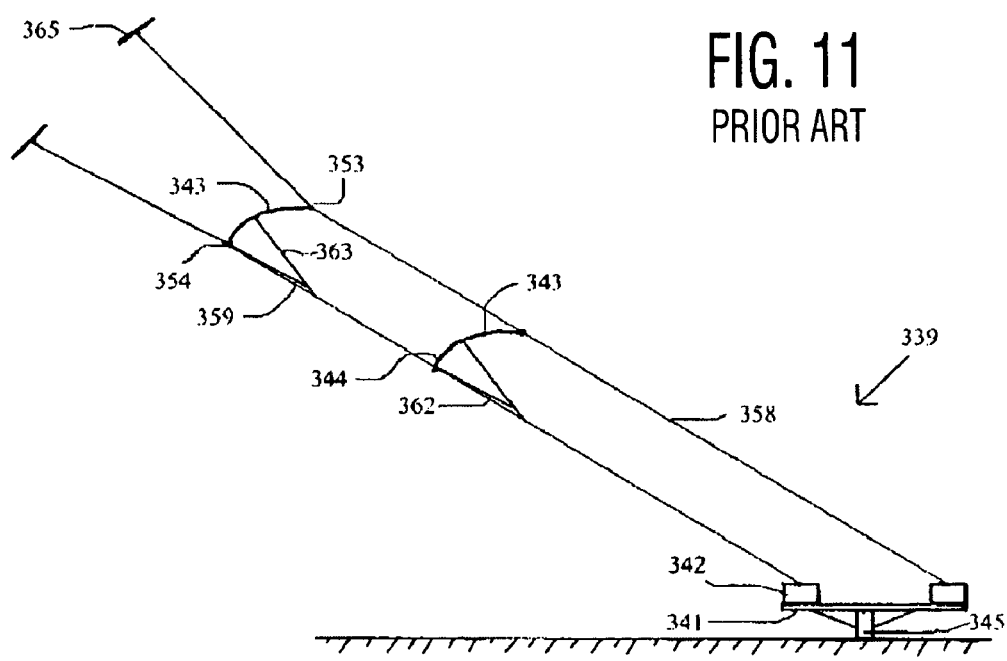

Bridle Lines and their Attachment:

The kite bridle lines 363 in prior art FIGS. 11 and 12 (which control the camber and add some rigidity) are shown to be attached to the bottom two tether lines at locations midway between the kites. For this embodiment of the invention, it is preferred to have the bridle lines from any given kite attached near the ends of the horizontal spar of the kite immediately below. In this way the bridle lines can be left permanently attached during launch and retrieval. This is more consistent with the aim of having automatic launch and retrieval.

It may be assumed that no bridle lines are attached below the bottom kite, since this would present a problem for unattended launch and retrieval. Instead of bridle lines the bottom kite would be made with stronger (sturdier) spars and/or could use a smaller total area of fabric in its construction, both of which would limit the bending or deformation of the kite in high wind speed conditions.

Kite Deployment:

The top kite of a train of kites differs from the other kites in that it may be left permanently attached to the tether lines. The top kite may be provided with a long distance radio link which allows the performance of either one (or both) of these functions:
1—Remote control of elevons and/or rudder
2—Information from instrumentation (e.g., accelerometers, gyros, altimeter) located on the top kite can be sent to a ground-based computer.

For remote operation of the system, one or more video cameras may be used to send live images of each corner of the platform during launch and retrieval and also images of the kites as they go through their power cycle travel. The video cameras may be mounted on a vertical pole rising from the windward corner of the platform. The video cameras may be pan/tilt/zoom types. An observer from the control side of the remote link can then see the knots in the tether line(s) as they move through the thru-holes of the valves, as shown in FIG. 2. A control operator can then send an actuation command to selected gear motors to lock or unlock the kite tether line attachment assemblies at their respective tether lines.

Additional automation of the system may be achieved by use of sensors to detect the presence of a knot in the thru-hole. The sensing may be based on an ultrasonic, capacitive or optoelectronic sensing method.

Figure 3:
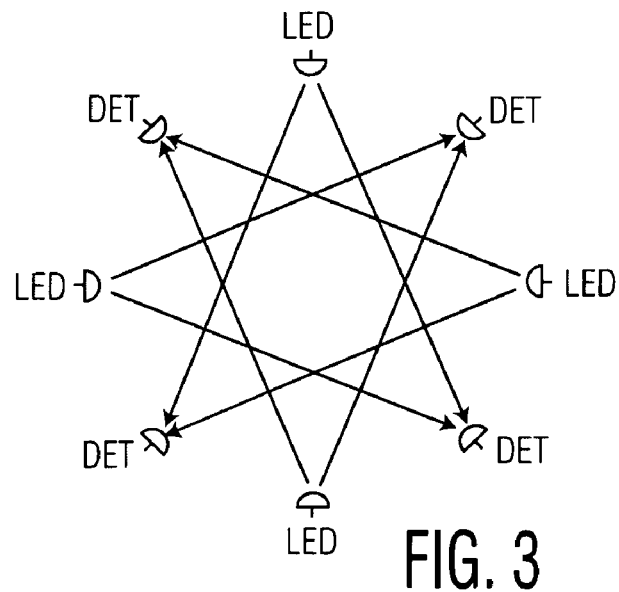
FIG. 3 is a layout diagram of an optoelectronic detection scheme for use in practicing one aspect of the invention.

FIG. 3 shows an optoelectronic system for knot detection using a number of light emitting diodes (LED's) and photodetectors to set up beam break paths. For this specific example, four LED's and four photodetectors are used to form an array of eight beam break paths. Four detectors and 8 LEDs could produce 16 beam break paths. A (relatively small diameter) tether line may block a few of the light paths. However, a knot, having a relatively larger diameter, will block many more of the light paths and will be detected.

Note that alternative schemes including magnetic or capacitive methods might eliminate the need for knots and could be used to provide a high friction arrangement to selectively clamp a kite to a tether line. A similar operation could be done with a linear actuator which clamps the tether line against the side wall of the aperture in FIGS. 2A and 2B. This clamping action would be similar to the brake function in automobiles.

Figure 9:
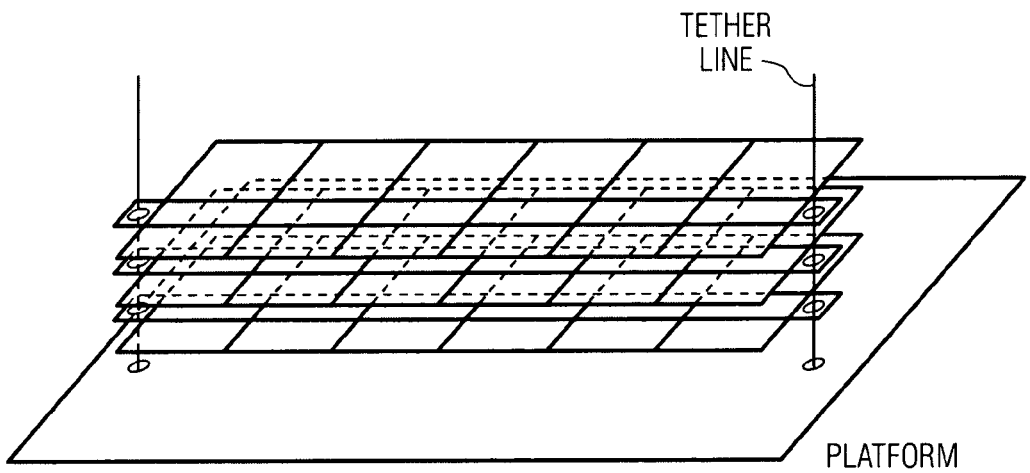
FIG. 9 is a showing of a train of kites sandwiched on a platform.

Operation of the System:

Under certain conditions (e.g., low wind or during a storm) the kites are retrieved and sandwiched one on top of the other on top of the platform (as suggested in FIG. 9). A kite in its deflated condition may take up less than two inches of vertical space. Thus, a train of 15 kites may take up less than 30 inches of vertical space on top of a platform. When the wind is in a speed range for efficient power production, the top kite is launched. Launching may be assisted with a simple lifting mechanism operating on the windward corner of the kite. The lifting mechanism could be a linear actuator attached to the video camera mounting pole (described above) or any other suitable arrangement.

After launch of the top kite, the tether lines are extended until the knots for the second kite come into their proper location for attachment. As each set of knots moves into place, the appropriate gear motor causes the corresponding corner of the kite to be locked to the corresponding tether line. This process continues until all the subsequent kites in the train are launched. After all the subsequent kites are launched, the kites may be moved to an operating altitude and power cycling begins. When wind or weather conditions become unsuited for power production, the kites may be brought back to the launching platform by reversing the process described above (with control of the pitch angle of the kites to ensure easy pull back).

Types of Kites and their Shapes for Best Operation:

As is known (e.g., article by Miles Loyd in 1980), the kites need to have a high lift to drag ratio (L/D) in order to take full advantage of the cross wind pattern of motion. Achieving a high L/D ratio normally requires a high aspect ratio (ratio of wingspan to chord). This corresponds to the long slender wings of modern sailplanes or gliders. High L/D also requires an airfoil cross sectional shape for the wings as is found with modern airplanes. These characteristics are shown in the Flexifoil type of kite (prior art U.S. Pat. No. 4,129,272). This type of kite is known to be very fast (over 100 MPH) using a cross wind pattern. The Flexifoil kite requires only two control (tether) lines and allows for stacking of multiple kites in a train. However, this kite type, as originally designed, is not well suited for high speed travel upwind, as compared to a flat surface kite. In accordance with this invention, the Flexifoil type kite may be modified in several ways for the generation of power, as shown in the drawings and discussed below.

Figure 4:
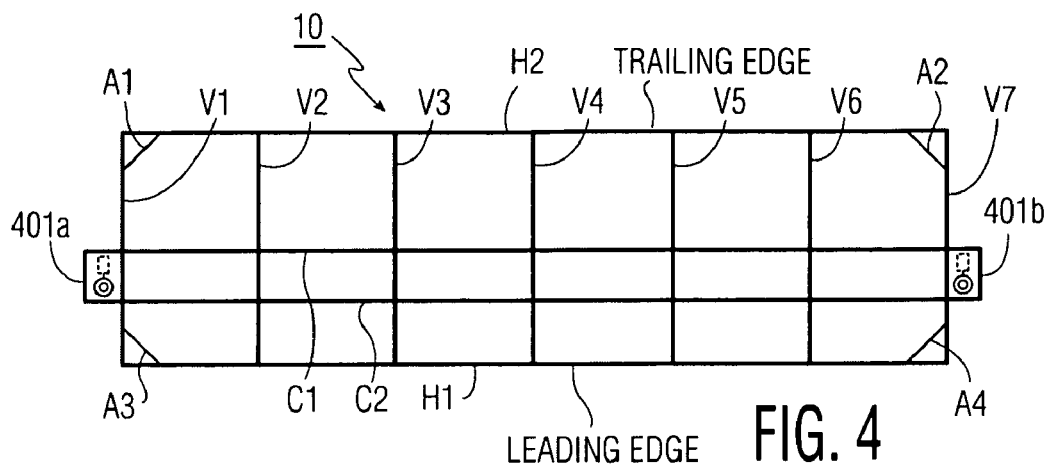
FIG. 4 is a simplified top view of a kite framework with provision for two tether lines suitable for use in practicing the invention.
Figure 4A:
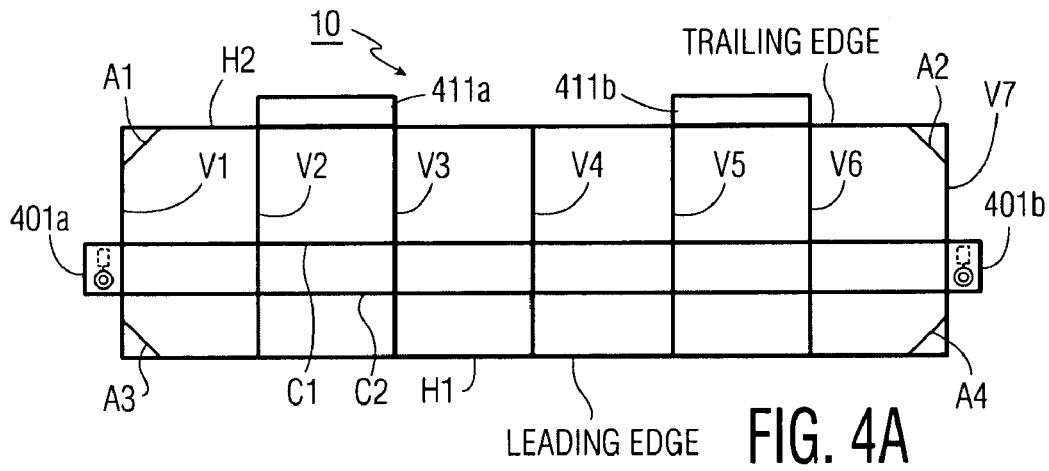
FIGS. 4A and 4B are simplified diagrams showing modifications to the kite system of FIG. 4.

To strengthen the kite, the soft, wind-inflated fabric may be attached to a strong, stiff rectangular framework. (aspects of which are shown, for example, in U.S. Pat. No. 5,213,289, and others). This enables changing the pitch angle when high speed upwind travel is desired. In contrast to the Flexifoil design, a stiff rectangular framework allows for the two tether lines to be attached at places other than the two upwind corners (as the Flexifoil requires). This is shown in FIG. 4. As may be recognized from an examination of FIG. 4, the imaginary line connecting the two tether line attachment points passes through the central region of the kite close to the center of lift and center of mass of the kite. This allows for rotation about the imaginary connecting line to change pitch angle. This may be done in several different ways:

1. As shown in FIGS. 1 of U.S. Pat. Nos. 5,213,289 and 3,338,536, additional tether (control) lines may be added to the downwind (trailing) edge of the kite. With three lines, the ground platform and controls would be similar to that shown in FIG. 1 above.
2. Alternatively, when only two tether lines are being used, additional control surfaces (flaps, ailerons, etc.) may be added to the downwind (trailing) edge of the kite, as shown in FIG. 4A. This system (using only two tether lines) results in a simpler platform and launch and retrieval process since only two capstan-reel modules are required. Also, the two three-way gearboxes may be eliminated, although either one or two of them may still be useful for faster control of the orientation of the kites. This is shown in FIG. 1A.

FIG. 4 shows a kite 10 with a solid framework embodying one aspect of the invention. For ease of description, the kite is shown to be rectangular, however, it should be understood that it can have any shape so long as it is generally symmetrical about a central axis. In FIG. 4, the kite 10 is shown to have horizontal spars H1 and H2 defining the leading edge and trailing edge of the kite and vertical spars V1 and V7 defining the two outer ends of the kite. The outer perimeter of the kite is defined by the interconnection of horizontal spars H1 and H2 with vertical spars V1 and V7. The structure may be reinforced with the use of angle elements A1, A2, A3 and A4. To add strength to the kite, any number of additional vertical spars (e.g., V2-V6) may be connected generally parallel to V1 and V7 between (and generally perpendicular to) H1 and H2. Centrally located (in general) spars C1, C2, parallel to H1 and H2, extend across the kite and beyond its outer ends defined by spars V1 and V7. The left end and right end of spars C1 and C2 support tether line attachment assemblies 401a and 401b. The assemblies 401a and 401b may be similar to what is shown in FIG. 2, above except they are now rectangular rather than triangular in shape. In the embodiment shown in FIG. 4, the kite may be controlled by means of the tether lines attached to the ends 401a and 401b. Additional control lines may be attached to the trailing edge of the kite. Alternatively, as shown in FIG. 4A, a kite may be controlled by the use of one or more control surfaces (411a, 411b) located on the kite. The control surface could be as simple as a single flap (or elevator) located at, or along, the center of the trailing edge of the kite. The control surfaces and their associated components may be similar to structures commonly used on large radio controlled model airplanes.

Figure 8:
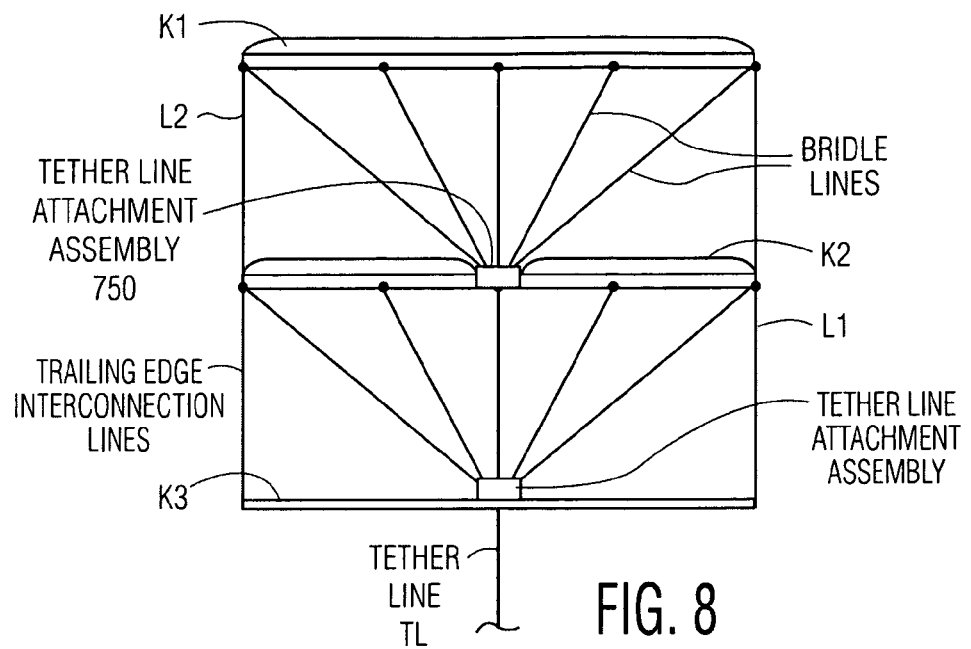
FIG. 8 is a front view of a number of kites of the type shown in FIG. 7, interconnected via bridle and tether lines.

To put the kite into a figure-8 pattern, differential control of the tether line length may be used (as with all two-line stunt kites). For very long tether lines, it may be preferable to use additional control surfaces on the kite. For example, two small flippers with servo control may be mounted along the outer edges of the kite. If one of these flippers produces an upward force and the other produces a downward force, the kite will be driven into a clockwise or counterclockwise spiral. Many different combinations of control surfaces may be used for more complete control of the kite's roll, pitch, yaw and trajectory as suggested in FIG. 4B.

Note that the topmost kite in a train may include a rudder. The top kite will generally be where most control is needed, depending on how the kites are attached to each other. It is generally not desirable to have a rudder on the intermediate kites of a train of kites in order to sandwich them compactly.

Figure 5:
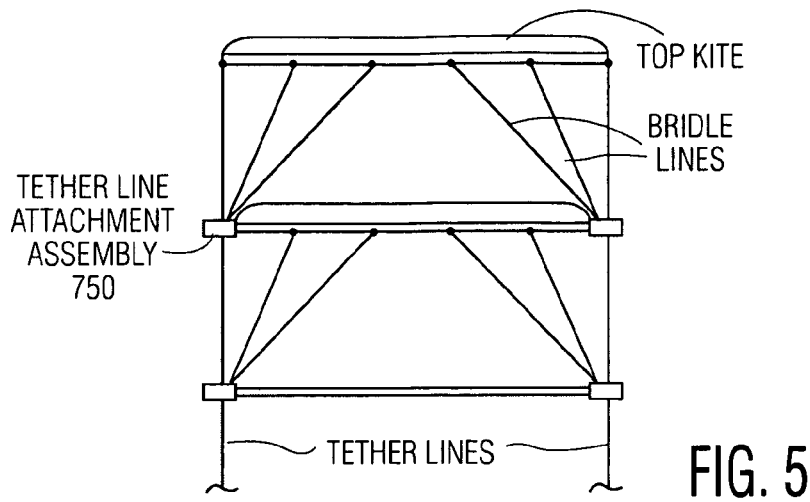
FIG. 5 is a simplified front view diagram showing a train of kites with bridle and tether lines interconnecting the kites.
Figure 6:
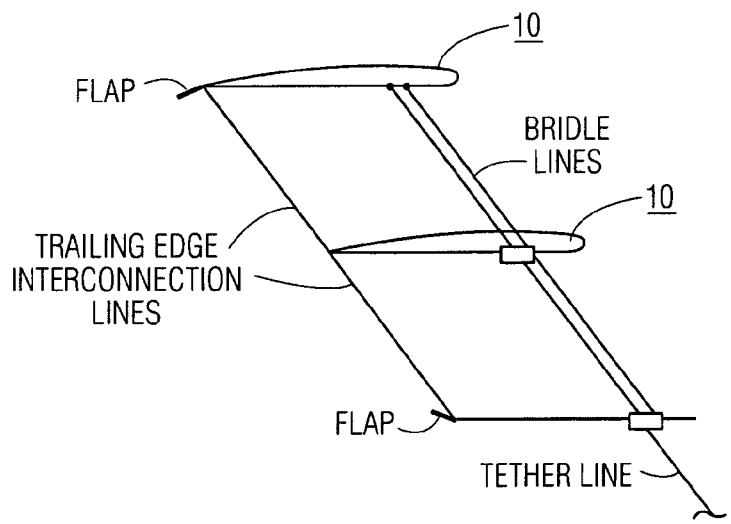
FIG. 6 is a simplified diagram showing a side view of a train of kites embodying the invention.

As shown in FIGS. 5 and 6, a bridle arrangement may be used to reduce the requirements for stiffness, weight and cost of the spars in FIG. 4. To allow for easy launch and retrieval, the bridle lines would preferably not be attached to the tether lines. Rather, the bridle lines would be attached to the spar closest to the axis of rotation of the kite immediately below, as shown in FIG. 5. FIG. 5 shows the top kite and the one below it with a wind inflated airfoil. The kites above the bottom kite would have an airfoil thickness characteristic of an optimum L/D wing. The bottom kite, however, is shown without this thickness because there are no bridle lines which could support a high lift force on this surface. Note that, alternatively, the spars in the bottom kite could be made sufficiently strong so that a high lift force could be supported without bridle lines. FIG. 5 shows each kite to be interconnected by four bridle lines. However, this is by way of example only and other numbers of bridle lines might be used.

FIG. 6 is a side view of this embodiment of the invention. As shown in FIG. 6, one or more control lines may be used to interconnect the trailing edges of all the kites in order to assure that all the kites in a train of kites will change their pitch by the same amount and at the same time. FIG. 6 also shows the use of control surfaces (flaps) to maintain tension in the trailing edge lines and to provide for pitch angle control.

Control of Kite Orientation:

The designs discussed above consider kites with 4, 3 and 2 tether lines. FIGS. 25 and 26 in U.S. Pat. No. 7,275,719 show a single tether line. However, these figures do not show a means for remote or automatic launch and retrieval. In accordance with the invention, the system shown in FIGS. 4, 5 and 6 can be converted to a single tether line system by replacing the two edge attachment assemblies with a single assembly near the center of the kite as shown in FIGS. 7 and 8

Figure 7:
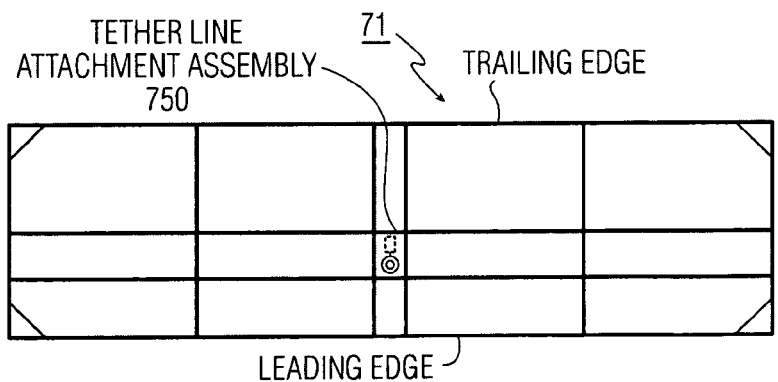
FIG. 7 is a simplified top view of a kite framework with a single tether line centrally located suitable for use in practicing the invention.

FIG. 7 is a top view of a kite 71 suitable for use with a single tether line. The kite is shown to be rectangular and to have cross supports similar to the kite of FIG. 4. The kite of FIG. 7 differs from the kite of FIG. 4 in that it has a single, centrally-placed attachment assembly 750 for attaching and securing the tether line to the kite.

Figure 4B:
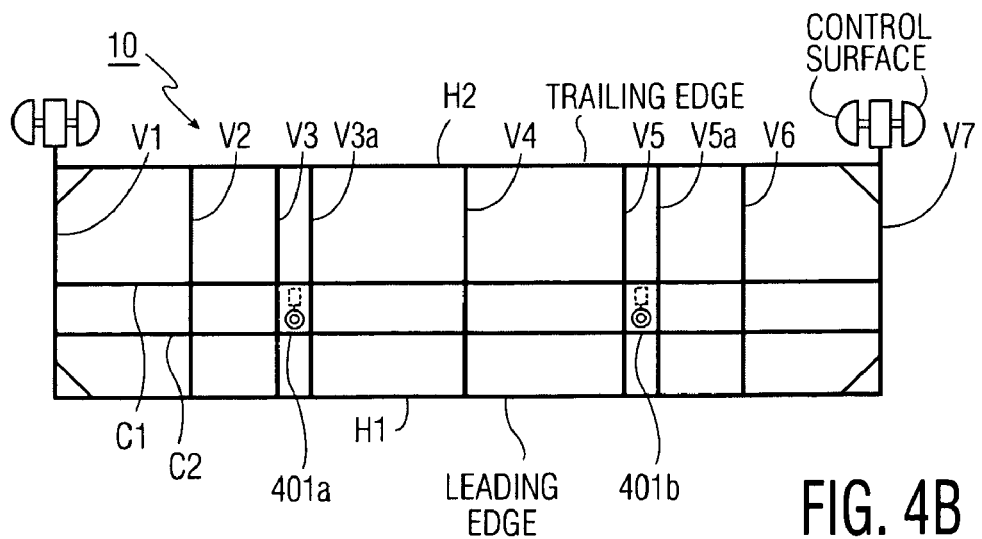

FIG. 8 shows kites K1, K2 and K3, with a portion of the tether line (TL) being connected between kites K1 and K2 and a portion of the tether line being connected between kites K2 and K3. Bridle lines are connected between selected points on each kite and the attachment assembly (750) of the kite immediately below. Also shown are trailing edge interconnecting lines L1 and L2 connected between selected end points of a kite to selected end points of a kite above or below it. We assume here that the single tether line kites will use control surfaces, one version of which is shown in FIG. 4B.

A problem with a single tether line system is maintaining control of the azimuth angle of the kites as the kites are brought (or come) down onto the platform since twisting can occur. For example, gusts of wind may cause each kite to have a variable angle around a vertical axis while sandwiched on top of the platform. A solution for this would be to use two or more vertical rods mounted on the platform and to have them located at the windward edge (leading edge) of the kites when the kites are at their optimum location on the platform. For a single tether line system, additional control surfaces (e.g., elevons or rudders) will be needed regardless of the length of the tether line, and with fast, precise control these will also minimize the azimuth angle twisting.

Note that the arrangement shown in side view in FIG. 6 will apply to either dual or single tether line systems. The showing in any of these figures may be extended to four or more kites by replicating what is shown for the middle kite in each case.

With sufficiently short tether lines, the dual tether line system (shown in FIG. 4) may not need control surfaces on the kites, except for flaps to provide pitch angle control. If a dual tether line system uses additional control surfaces, there will be a complex interaction between the effects of the control surfaces and the effects of differential tether line lengths. A suitable approach would be to use two tether lines and to place them closer to the center of the kites (see FIG. 4B). In this case if the tether lines are very long, the flight characteristics of the kites will be similar to the single tether line system and may thus avoid the complex interaction mentioned above. Also, with two tether lines, the azimuth angle positioning on the platform will be properly constrained. Another advantage of the proposed two tether line system is a better distribution of forces along the long axis of the kites. This may help reduce the number of bridle lines needed and allow for lighter weight spars for a given level of performance.

To have full control of pitch, roll, and yaw of the kites using control surfaces it may be desirable to use two or more dual servo/airfoil assemblies of the type shown in FIGS. 37, 38 and 39 of U.S. Pat. No. 7,275,719. These assemblies can give a variable upward force, downward force, and/or drag force with any desired percentage of each. At a minimum, these assemblies may be used at the downwind (rear) corners of the top kite of a train of kites. A more complete control arrangement may make use of these dual servo/airfoil assemblies on the bottom kite or one or more of the intermediate kites, in addition to their use on the top kite. These assemblies are shown at the two trailing edge corners in FIG. 4B.

Note that the launch and retrieval operations are easier if the top kite weight is minimized. To the extent that dual servo/airfoil assemblies are used, the weight of this kite is increased. In addition, radio control and sensing equipment mounted on the kite will add additional weight. The additional equipment may include a radio receiver, batteries, a battery charger mechanism, and a position/orientation sensing system. If it is desired to collect and transmit data to a ground based computer, a radio transmitter will also be needed. The problem of excess weight on the top kite may be resolved by using conductive bridle lines between the top kite and one or more of the kites below. In this way, all of the extra functional elements, other than the servos and control surfaces, can be placed on a lower kite so that this weight will be supported by two or more kites rather than a single kite.

The kite(s) of the invention are intended to be operable when wind and weather conditions permit. Operation at night is possible, but there may be various requirements such as lighting of the kites which would require imposing added weight on the kites. Power for these requirements may be obtained by using one or more alternators whose shaft is turned by wind power. Linear to rotary conversion for an alternator may be done with a trailing pinwheel, a multi blade propeller, a ducted fan assembly, or a rotating cup mechanism as is used with anemometers.

Kites for Towing Ships:

In accordance with the invention, multiple kites with automatic launch and retrieval capability may be useful for towing boats or ships. The Flexifoil type of kite or a modified version using a solid framework may be used for this function. A train of kites could be used with a control system based on FIG. 1; however a generator is not needed for towing. When the kites are not in use they could be retrieved and stacked (sandwiched) together on top of a rotatable platform as described above. As before, a linear actuator may be used to lift the leading edge of the top kite during the initial phase of launching. For optimum towing of a ship, a computer may be used to establish the best azimuth direction for the flight of the kites and the best crosswind pattern. Since no power cycling is needed for ship towing, there is no need for high speed upwind travel. When the kites are being pulled back, the apparent wind speed will generally be less than the real wind speed.

It has been noted that kites can also be used to propel ships directly against the wind. In this case, it may be desirable and/or necessary to generate electricity as an intermediate form of energy. When electricity is to be generated, there is a need for the kites to have a high speed travel upwind. This requirement suggests a need for pitch control and a kite with a solid framework, as discussed above. Where a long ship is involved, it may be possible to use two or more platforms and kite trains to tow the ship or generate electricity for propulsion.

What is claimed is:

1. A system comprising:
 a plurality of kites that include a first kite and at least one subsequent kite;
 a tether having a first end coupled to said first kite and a second end coupled to a reel, wherein said tether passes through an opening in each said subsequent kite; and
 an actuator carried by each said subsequent kite that operates between an engaged condition and a disengaged condition, wherein said actuator engages said tether when in said engaged condition, therein holding each said subsequent kite at a fixed point along said tether, and wherein said actuator releases said tether when in said unengaged condition, therein enabling each said subsequent kite to freely move along said tether under said first kite, wherein said reel is coupled to a power generating system that generates electricity as said reel turns.

2. The system according to claim 1, wherein said tether includes a defined engagement area.

3. The system according to claim 2, further including a sensor for detecting when said engagement area on said tether passes into said opening in each said subsequent kite.

4. The system according to claim 3, wherein said actuator automatically changes to said engaged condition when said sensor detects said engagement area of said tether passing into said opening.

5. The system according to claim 1, wherein said actuator is selectively controllable by remote control.

6. A method of utilizing a string of kites to generate electricity, said method comprising the steps of:
   providing a generator;
   providing a plurality of wound tethers wherein each of said tethers is coupled to a said generator so that said tethers power said generator while unwinding;
   connecting each of said tethers to a first kite;
   connecting at least one subsequent kite to said tethers at a connection point below said first kite;
   flying said first kite and said subsequent kite as a string of kites, wherein said string of kites causes each of said tethers to unwind and power said generator;
   selectively causing said subsequent kite to disengage said tethers and move along said tethers when necessary.

7. The method according to claim 6, further including the step of rewinding said tethers and pulling said string of kites toward reels, wherein said step of selectively causing said subsequent kite to disengage said tether occurs as said string of kites approaches said reels.

8. The method according to claim 6, wherein said step of connecting a subsequent kite to said tethers includes passing said tethers through openings in said subsequent kite and engaging said tethers with a tether engagement actuator.

9. The method according to claim 8, wherein said tether engagement actuator is remotely controlled.

10. The method according to claim 8 further including the step of providing engagement areas along each of said tethers.

11. The method according to claim 10, further including the step of detecting when one of said engagement areas passes into one of said openings in said subsequent kite.

12. The method according to claim 11, further including the step of automatically activating said tether engagement actuator when one of said engagement areas on one of said tethers is detected.

\* \* \* \* \*